United States Patent
Peng

(10) Patent No.: US 10,411,903 B2
(45) Date of Patent: Sep. 10, 2019

(54) INFORMATION SECURITY REALIZING METHOD AND SYSTEM BASED ON DIGITAL CERTIFICATE

(71) Applicant: ZTE CORPORATION, Shenzhen, Guangdong Province (CN)

(72) Inventor: Yihui Peng, Shenzhen (CN)

(73) Assignee: ZTE CORPORATION (CN)

( * ) Notice: Subject to any disclaimer, the term of this patent is extended or adjusted under 35 U.S.C. 154(b) by 221 days.

(21) Appl. No.: 15/326,653

(22) PCT Filed: Mar. 26, 2015

(86) PCT No.: PCT/CN2015/075143
§ 371 (c)(1),
(2) Date: May 31, 2017

(87) PCT Pub. No.: WO2016/011827
PCT Pub. Date: Jan. 28, 2016

(65) Prior Publication Data
US 2017/0257221 A1 Sep. 7, 2017

(30) Foreign Application Priority Data

Jul. 22, 2014 (CN) .......................... 2014 1 0350559

(51) Int. Cl.
*H04L 9/32* (2006.01)
*H04L 29/06* (2006.01)
(Continued)

(52) U.S. Cl.
CPC ............ *H04L 9/3265* (2013.01); *G06F 21/57* (2013.01); *H04L 9/32* (2013.01); *H04L 9/3247* (2013.01);
(Continued)

(58) Field of Classification Search
CPC ............ H04L 63/0272; H04L 63/0823; H04L 63/1416; H04L 63/029; H04L 63/0807; H04L 9/32; G06F 9/45558; G06F 21/31
(Continued)

(56) References Cited

U.S. PATENT DOCUMENTS 9,215,231 B1 * 12/2015 Bowen ................ H04L 63/1416
2010/0042846 A1 * 2/2010 Trotter .................... G06F 21/31
713/182
(Continued)

FOREIGN PATENT DOCUMENTS

| CN | 102932459 A | 2/2013 |
| CN | 103248479 A | 8/2013 |

(Continued)

OTHER PUBLICATIONS

NIST—Entity Authentication Using Public Key Cryptography Publication Date: Feb. 18, 1997 Series/No. Federal Information Processing Standard (FIPS) 196 pp. 53 (Year: 1997).*

(Continued)

*Primary Examiner* — Brandon S Hoffman
*Assistant Examiner* — Ali H. Cheema
(74) *Attorney, Agent, or Firm* — McDonald Hopkins LLC

(57) ABSTRACT

A digital certificate based information security realization method and system are provided. The method includes: separately issuing a digital certificate for a cloud management host, a physical cloud computing host and a virtual cloud computing machine; and carrying out a compliance authentication according to a corresponding digital certificate when the cloud management host, the physical cloud computing host and the virtual cloud computing machine start up or are in the running process. By using a digital certificate trust chain technology for reference and combining with a cloud management system, the digital certificate
(Continued)

based information security realization method and system provided in embodiments of the present disclosure realize trusted systems of the cloud management system, the physical host and the virtual machine; beside, by putting emphasis on the security protection of the host platform of a system itself, the security of a virtual cloud platform is improved.

10 Claims, 4 Drawing Sheets

(51) Int. Cl.
G06F 21/57 (2013.01)
H04L 29/08 (2006.01)
(52) U.S. Cl.
CPC ...... *H04L 63/0281* (2013.01); *H04L 63/0823* (2013.01); *H04L 67/1002* (2013.01)
(58) Field of Classification Search
USPC ........ 713/151, 156, 157, 158, 182; 717/171; 726/4, 6
See application file for complete search history.

(56) References Cited

U.S. PATENT DOCUMENTS

| | | | | |
|---|---|---|---|---|
| 2011/0004753 | A1* | 1/2011 | Gomi | H04L 63/0807 713/156 |
| 2011/0202755 | A1* | 8/2011 | Orsini | H04L 63/029 713/151 |
| 2011/0271270 | A1* | 11/2011 | Bowen | G06F 9/45558 717/171 |
| 2012/0089833 | A1 | 4/2012 | Jirka et al. | |
| 2012/0265976 | A1 | 10/2012 | Spiers et al. | |
| 2014/0013325 | A1 | 1/2014 | Shimoni et al. | |
| 2015/0095995 | A1* | 4/2015 | Bhalerao | H04L 63/0823 726/6 |
| 2015/0244707 | A1* | 8/2015 | Bowen | H04L 63/0823 713/158 |
| 2016/0044035 | A1* | 2/2016 | Huang | H04L 63/0272 726/4 |

FOREIGN PATENT DOCUMENTS

| | | |
|---|---|---|
| CN | 103312691 A | 9/2013 |
| WO | WO2013165859 A1 | 11/2013 |

OTHER PUBLICATIONS

A Framework for Secure Cloud Computing by Ahmed E. Youssef and Manal Alageel IJCSI International Journal of Computer Science Issues, vol. 9, Issue 4, No. 3, Jul. 2012 Number of Pages: 14 (Year: 2012).*
Entity Authentication Using Public Key Cryptography by NIST Publication Date(s): Feb. 18, 1997 Number of Pages: 53 (Year: 1997).*
Udhayakumar Shanmugam et al., Attestation for Trusted Computing to Assure Security in Cloud Deployment Services, International Journal of Information and Electronics Engineering, vol. 2, No. 4, Jul. 2012. pp. 644-648. XP55575896A.
Tal Garfinkel, Computer Science Department, Stanford University et al., Terra: A Virtual Machine-Based Platform for Trusted Computing, SOSP'03, Oct. 19-22, 2003, Bolton Landing, New York, USA, pp. 193-206, XP58145993A.
Office Action dated Apr. 5, 2019 for European Patent Application No. 15824515.9.

* cited by examiner

INFORMATION SECURITY REALIZING METHOD AND SYSTEM BASED ON DIGITAL CERTIFICATE

TECHNICAL FIELD

Embodiments of the present disclosure relate to the field of network communication technologies, and in particular to a digital certificate based information security realization method and system for use in the field of mobile interconnections and cloud computing.

BACKGROUND

With the rapid development of Internet technologies, a system whose computing resources are virtualized has been proposed and is developing gradually, because virtualization technology can bring enterprises practical benefits in resource sharing and operation cost reduction, more and more enterprises are currently selecting a virtual cloud platform as their service bearer.

Along with the large-scale application of virtualization technology, the security of a system starts to gain great attention. The conventional security precautions are started from a boundary protection access side, that is, the user name and the password of a user are authenticated or a certificate issued by a Certificate Authority (CA) center is verified when the user access to a system, thereby guaranteeing the security of the user and an access channel.

However, in practical applications, in the inside of a virtual cloud platform, a physical cloud computing host is generally isolated from a virtual cloud computing machine by a Virtual Local Area Network (VLAN); through a VLAN isolation technology, the network devices in a network system can be divided into a plurality of virtual working groups, and the network devices in different groups are isolated from each other on the second layer. As the VLAN isolation technology is based on the isolation of the second layer from the third layer, different network users and network resources can be grouped, and the data exchange between the network devices of one group can be isolated from that between the network devices of another group by a switcher supporting the VLAN technology, thereby guaranteeing the security of a network. This mode allows the users on the same VLAN to communicate with each other, but the users on different VLANs are disconnected from each other on a data link layer and therefore can only access each other through three layers of routers.

The VLAN isolation technology, although capable of guaranteeing the isolation of physical devices, only allows a single server to be fully and synchronously opened for a plurality of VLAN groups or only opened for a certain VLAN group, incapable of limiting a specific user. Moreover, in practical applications, a server plays the roles of various kinds of servers to provide different services for the users in a plurality of VLAN groups, this causes the following safety hazard: a virtual cloud system based on the isolation technology is likely to be attached and cracked by some malicious people or organizations, and even worse, a virtual cloud computing machine may be illegally created and controlled by malicious people or organizations, thus threatening the safety of a system.

SUMMARY

To address the foregoing technical problem, embodiments of the present disclosure provide a digital certificate based information security realization method and system which care capable of improving the safety of a virtual cloud system.

To realize the foregoing technical purpose, a digital certificate based information security realization method provided in an embodiment of the present disclosure includes:

separately issuing a digital certificate for a cloud management host, a physical cloud computing host and a virtual cloud computing machine; and carrying out a compliance authentication according to a corresponding digital certificate when the cloud management host, the physical cloud computing host and the virtual cloud computing machine start up or are in running process.

Alternatively, the issuing a digital certificate for the cloud management host includes:

a CA center generates a digital certificate for the cloud management host according to the key attribute information of the cloud management host and makes a card;

Alternatively, the issuing a digital certificate for the physical cloud computing host includes:

the cloud management host acquires the key attribute information of the physical cloud computing host through a certificate proxy deployed on a corresponding physical cloud computing host and sends an application for a digital certificate for the physical cloud computing host to the CA center according to the key attribute information acquired; and the CA center verifies the digital certificate of the cloud management host and, if the verification is passed, it generates a digital certificate for the physical cloud computing host according to the key attribute information of the physical cloud computing host and makes a card.

Alternatively, the issuing a digital certificate for the virtual cloud computing machine includes:

after verifying that the physical cloud computing host to which the virtual cloud computing machine belongs is normal, the cloud management host acquires the key attribute information of the virtual cloud computing machine and sends an application for a digital certificate for the virtual cloud computing machine to the CA center according to the key attribute information acquired;

the CA center verifies the digital certificate of the cloud management host and, if the verification is passed, it generates a digital certificate file for the virtual cloud computing machine according to the key attribute information of the virtual cloud computing machine;

the CA center returns an encrypted digital certificate file for the virtual cloud computing machine to the cloud management host; and the cloud management host returns the encrypted digital certificate file for the virtual cloud computing machine to the physical cloud computing host to which the virtual cloud computing machine belongs; the physical cloud computing host verifies the encrypted digital certificate file for the virtual cloud computing machine through a proxy program deployed thereon, creates an isolated certificate container in a certificate key according to the key attribute information of the virtual cloud computing machine and writes the digital certificate for the virtual cloud computing machine in the certificate container.

Alternatively, each certificate container in the certificate key is arranged to store a separate digital certificate.

Alternatively, carrying out a compliance authentication according to a corresponding digital certificate when the cloud management host starts up includes:

a certificate proxy deployed on the cloud management host sends an online or offline authentication request to the CA center and generates a random number Ra for the current authentication, and the CA center responds to the request and returns a random number Rb for authentication;

the certificate proxy of the cloud management host reads the digital certificate of the cloud management host from the certificate key according to the key attribute information of the cloud management host, performs digital signature on the random number Ra for the current authentication and the random number Rb for authentication using the digital certificate and sends the result of the signature, the digital certificate of the cloud management host and the random number Ra for the current authentication to the CA center; and the CA center authenticates the information received and, if the authentication is past, informs the cloud management host to continue to start up the flow.

Alternatively, carrying out a compliance authentication according to a corresponding digital certificate when the physical cloud computing host starts up includes:

a certificate proxy deployed on the physical cloud computing host reads the digital certificate of the physical cloud computing host from the certificate key according to the key attribute information of the physical cloud computing host, sends an online or offline authentication request to the CA center and generates a random number Ra for the current authentication, and the CA center responds to the request and returns a random number Rb for authentication; and the certificate proxy of the physical cloud computing host reads the digital certificate of the physical cloud computing host from the certificate key according to the key attribute information of the physical cloud computing host, performs digital signature on the random number Ra for the current authentication and the random number Rb for authentication using the digital certificate and sends the result of the signature, the digital certificate of the physical cloud computing host and the random number Ra for the current authentication to the CA center; and the CA center authenticates the information received and, if the authentication is past, informs the physical cloud computing host to continue to start up the flow.

Alternatively, carrying out a compliance authentication according to a corresponding digital certificate when the virtual cloud computing machine starts up includes:

a certificate proxy on the physical cloud computing host to which the virtual cloud computing machine belongs reads the digital certificate of the virtual cloud computing machine from a corresponding certificate container in the certificate key according to the key attribute information of the virtual cloud computing machine, sends an online or offline authentication request to the CA center and generates a random number Ra for the current authentication, and the CA center responds to the request and returns a random number Rb for authentication; and the certificate proxy on the physical cloud computing host performs digital signature on the random number Ra for the current authentication and the random number Rb for authentication according to the digital certificate of the virtual cloud computing machine and sends the result of the signature, the digital certificate of the virtual cloud computing machine and the random number Ra for the current authentication to the CA center; and the CA center authenticates the information received and, if the authentication is past, informs the virtual cloud computing machine to continue to start up the flow.

Alternatively, carrying out a compliance authentication according to a corresponding digital certificate when the cloud management host is in running process includes:

when the time set by a preset first timer is up, the certificate proxy of the cloud management host acquires the key attribute information of the cloud management host, reads the digital certificate of the cloud management host from the certificate key according to the key attribute information acquired and sends an online or offline authentication request to the CA center; and the cloud management host continues to run if the authentication implemented by the CA center is past.

Alternatively, carrying out a compliance authentication according to a corresponding digital certificate when the physical cloud computing host is in running process includes:

when the time set by a preset second timer is up, the certificate proxy of the physical cloud computing host acquires the key attribute information of the physical cloud computing host, reads the digital certificate of the physical cloud computing host from the certificate key according to the key attribute information acquired and sends an online or offline authentication request to the CA center; and the physical cloud computing host continues to run if the authentication implemented by the CA center is past.

Alternatively, carrying out a compliance authentication according to a corresponding digital certificate when the virtual cloud computing machine is in running process includes:

when the time set by a preset third timer is up, the certificate proxy of the physical cloud computing host to which the virtual cloud computing machine belongs acquires the key attribute information of the virtual cloud computing machine, reads the digital certificate of the virtual cloud computing machine from a corresponding certificate container in the certificate key according to the key attribute information acquired and sends an online or offline authentication request to the CA center; and the virtual cloud computing machine continues to run if the authentication implemented by the CA center is past.

A digital certificate based information security realization system includes: a CA center, a cloud management host, a physical cloud computing host and at least one virtual cloud computing machine created according to the physical cloud computing host, herein the CA center is arranged to separately issue a digital certificate for the cloud management host, the physical cloud computing host and the virtual cloud computing machine under the management control of the cloud management host;

the cloud management host is arranged to carry out a compliance authentication according to a corresponding digital certificate during the startup or running process thereof;

the physical cloud computing host is arranged to carry out a compliance authentication according to a corresponding digital certificate during the startup or running process thereof; and the virtual cloud computing machine is arranged to carry out a compliance authentication according to a corresponding digital certificate during the startup or running process thereof.

By using a digital certificate trust chain technology for reference and combining with a cloud management system, the digital certificate based information security realization method provided in embodiments of the present disclosure realizes trusted systems of the cloud management system, the physical host and the virtual machine; beside, by putting emphasis on the security protection of the host platform of a system itself, the security of a virtual cloud platform is improved.

BRIEF DESCRIPTION OF DRAWINGS

The accompanying drawings described herein which are form a part of the application are provided for the better understanding of the present disclosure, and exemplary embodiments of the present disclosure and the description thereof serve to illustrate the present disclosure but are not to be construed as improper limitations to the present disclosure. In the accompanying drawings.

Figure 1:
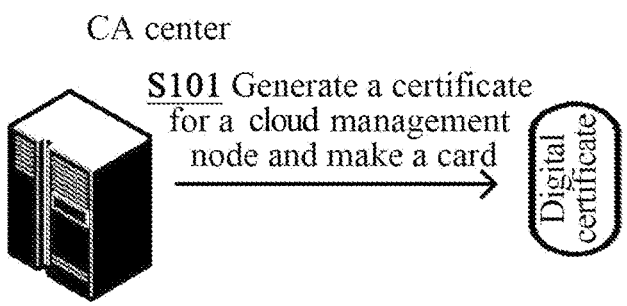
FIG. 1 is a flowchart illustrating the issuing of a digital certificate for a cloud management host in an embodiment of the present disclosure.

The achieving of the target, the functional features and the advantages of the present disclosure will be further described below in conjunction with embodiments and accompanying drawings.

DETAILED DESCRIPTION

To make the target, the technical solutions and the advantages of embodiments of the present disclosure understood better, the embodiments of present disclosure will be described below in detail in conjunction with accompanying drawings. It should be noted that the embodiments of the present application and the features thereof can be combined with each other if no conflict is caused.

It should be appreciated that the specific embodiments described herein are merely illustrative of but are not to be construed as limiting the present disclosure.

In embodiments of the present disclosure, as a trusted third party in electronic commerce trades, a CA center, that is, a certificate authority center, or a called certificate authority proxy, is responsible for verifying the legality of a public key in a public key system.

The CA center separately issues a digital certificate for a cloud management host, a physical cloud computing host and a virtual cloud computing machine. The CA center architecture includes a Public Key Infrastructure (PKI) structure, high-strength anti-attach public encryption/decryption algorithms, a digital signature technology, an identity authentication technology, an operation safety management technology, a reliable trust responsibility system and so on. From the perspective of the roles involved in a service flow, the CA center includes an authentication proxy, a digital certificate library and a blacklist library, a secret key escrow processing system, a certificate directory service and a certificate examining, approving and canceling system.

The currently available CA digital certificate services mainly include: the application, the signing and the issuing of a digital certificate; the inquiry, the cancellation, the update and the filing of a certificate, and an online certificate state inquiry service is provided, and the management of a secret key, mainly including the generation, the storage, the update, the backup and the recovery of a secret key.

In embodiments of the present disclosure, the certificate issuing and the online authentication are typically conducted by separate physical devices in the CA.

In embodiments of the present disclosure, the cloud management host is a management node which is responsible for management and scheduling in a virtual cloud platform and capable of monitoring the running status of a virtual resource such as a physical cloud computing host (a computing node), a storage node and scheduling the virtual resource according to the running status thereof, moreover, the cloud management host is also capable of maintaining a resource, including managing the virtual machine involved in embodiments of the present disclosure, sending and managing an online application for a digital certificate for the physical cloud computing host and the virtual cloud computing machine involved in embodiments of the present disclosure.

In embodiments of the present disclosure, the physical cloud computing host, as a physical machine of a virtual cloud computing node, is mainly responsible for endowing a virtual system with a computing capability, thus, the physical cloud computing host serve is a virtual machine bearer.

In embodiments of the present disclosure, with regard to the virtual cloud computing machine, the cloud management host can extract a virtual CPU resource, a memory resource and network resources and the like after virtualizing a physical cloud computing host in order to form the virtual cloud computing machine as needed. Generally, a physical cloud computing host can create a plurality of virtual cloud computing machines according to the resource and service usage condition thereof.

In embodiments of the present disclosure, the certificate key is a physical entity responsible for storing digital certificates. The certificate key includes, but is not limited to be: a USB_key, a Bluetooth KEY, the Trans-Flash (TF) card key of a mobile terminal and keys in other forms.

For example, in some embodiments, the USB key inserted into the USB port of the physical cloud computing host stores the digital certificate of the physical cloud computing host itself as well as that of the virtual cloud computing machine depending on the physical cloud computing host.

In embodiments of the present disclosure, the certificate proxy is a piece of background software responsible for the physical cloud computing host and the virtual cloud computing machine to read and authenticate a digital certificate, which is generally deployed on each physical cloud computing host.

The digital certificate based information security realization method provided in an embodiment of the present disclosure includes:

separately issuing a digital certificate for a cloud management host, a physical cloud computing host and a virtual cloud computing machine and carrying out a compliance authentication according to a corresponding digital certificate when the network elements start up or are in running process.

In the present embodiment, the digital certificates separately issued for the cloud management host, the physical cloud computing host and the virtual cloud computing machine are stored in a certificate key which supports the storage of a plurality of digital certificates that are isolated from each other through certificate containers, each container in the certificate key is arranged to store a separate digital certificate, and the reader of each digital certificate can only read the digital certificate according to the user has the right to read.

By using a digital certificate trust chain technology for reference and combining with a cloud management system, the digital certificate based information security realization method provided in embodiments of the present disclosure realizes trusted systems of the cloud management system, the physical host and the virtual machine; moreover, besides, by putting emphasis on the security protection of the host platform of a system itself, the security of a virtual cloud platform is improved.

In the embodiment of the present disclosure, it is needed to separately issue a digital certificate for a cloud management host, a physical cloud computing host and a virtual cloud computing machine and carry out a compliance authentication according to a corresponding digital certificate when the network elements start up or are in running process. Specifically, when creating the virtual cloud computing machine, the cloud management host sends an application for a digital certificate to the CA center according to key attributes of the virtual cloud computing machine device, herein the key attributes consist of the virtual MAC address, the virtual CPU information and other information of the virtual cloud computing machine device; and the CA center generates a corresponding digital certificate according to key attribute values of the virtual cloud computing machine, encrypts the generated digital certificate and sends the encrypted digital certificate to a certificate proxy on the physical cloud computing host where the virtual cloud computing machine exists. The certificate proxy on the physical cloud computing host creates isolated certificate containers in a certificate key according to key attributes of different virtual cloud computing machines and writes the digital certificates of the virtual cloud computing machines into the certificate containers.

When the virtual cloud computing machine starts up, a corresponding encrypted digital certificate is read from the certificate key according to the key attribution information of the virtual cloud computing machine and then subjected to a CA authentication, and the subsequent start up of the virtual cloud computing machine is not allowed unless the authentication is past.

Moreover, the adoption of a mechanism of regularly automatically authenticating by a certificate proxy during the running process of the virtual cloud computing machine guarantees the security of a cloud platform in a working state. In addition, the certificate links thereof are authenticated by each other during an authentication process, for example, the CA center authenticates the signature of the cloud management host, the cloud management host authenticates the signature of the physical cloud computing host, and the physical cloud computing host authenticates the signature of the virtual cloud computing machine, thereby guaranteeing the reliability of each node in a system.

Specifically, in the present embodiment, as shown in FIG. 1, issuing a digital certificate for the cloud management host includes:

S101: the CA center generates a certificate by taking a unique string generated using the hash algorithm according to on the key attribute information of the cloud management host (a cloud management node) as an input for the generation of a certificate for the cloud management host and writes the generated certificate into the certificate key to complete the making of a card, in the present embodiment, the key attribute information of the cloud management host includes, but is not limited to, the MAC address and the CPU number of the cloud management host.

Figure 2:
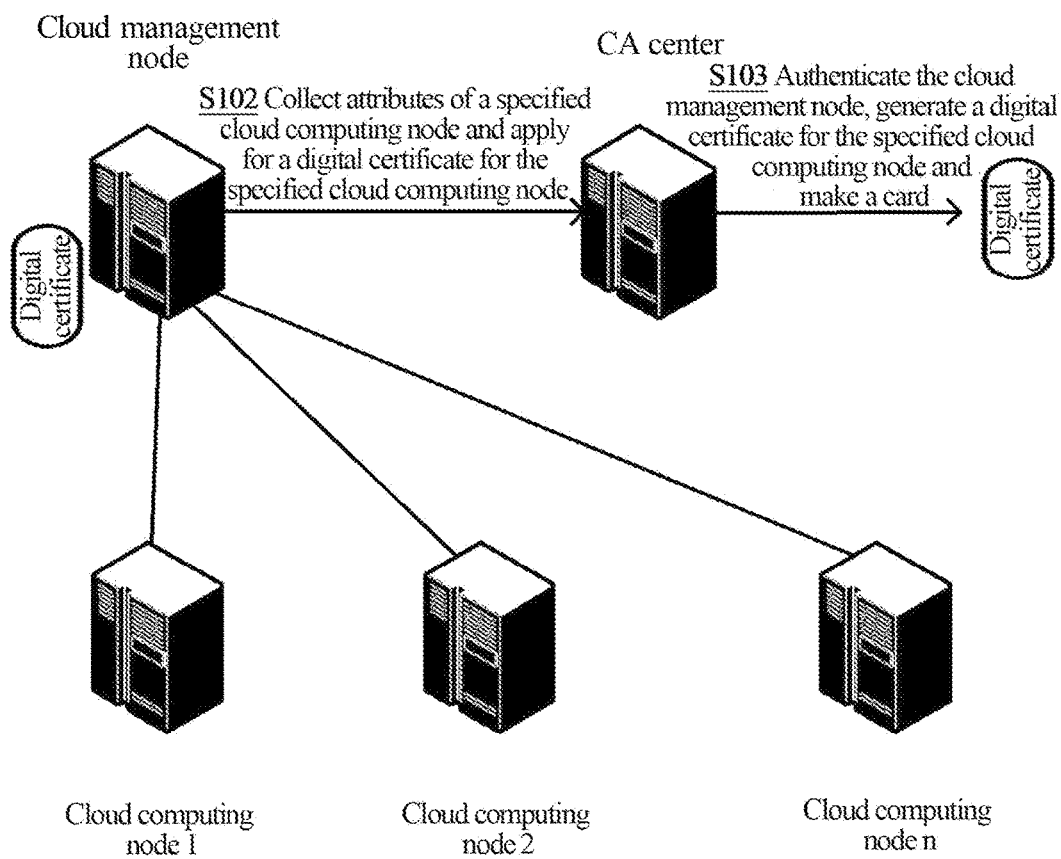
FIG. 2 is a flowchart illustrating the issuing of a digital certificate for a physical cloud computing host in an embodiment of the present disclosure.

Specifically, refer to FIG. 2, in the present embodiment, issuing a digital certificate for the physical cloud computing host includes:

S102: the attribute information of a specified physical cloud computing host (a cloud computing node) is collected so as to apply for a device certificate for the specified cloud computing node, specifically, the cloud management host acquires the key attribute information (e.g. the MAC address, the CPU number and other key information) of the physical cloud computing host through a certificate proxy deployed on a corresponding physical cloud computing host and sends an application for a digital certificate for the physical cloud computing host to the CA center according to the key attribute information acquired.

S103: the CA center authenticates the cloud management node to generate a digital certificate for the specified cloud computing node and make a card, specifically, the CA center authenticates the digital certificate of the cloud management host and, if the authentication is past, generates a digital certificate for the physical cloud computing host according to the key attribute information of the physical cloud computing host and makes a card.

Figure 3:
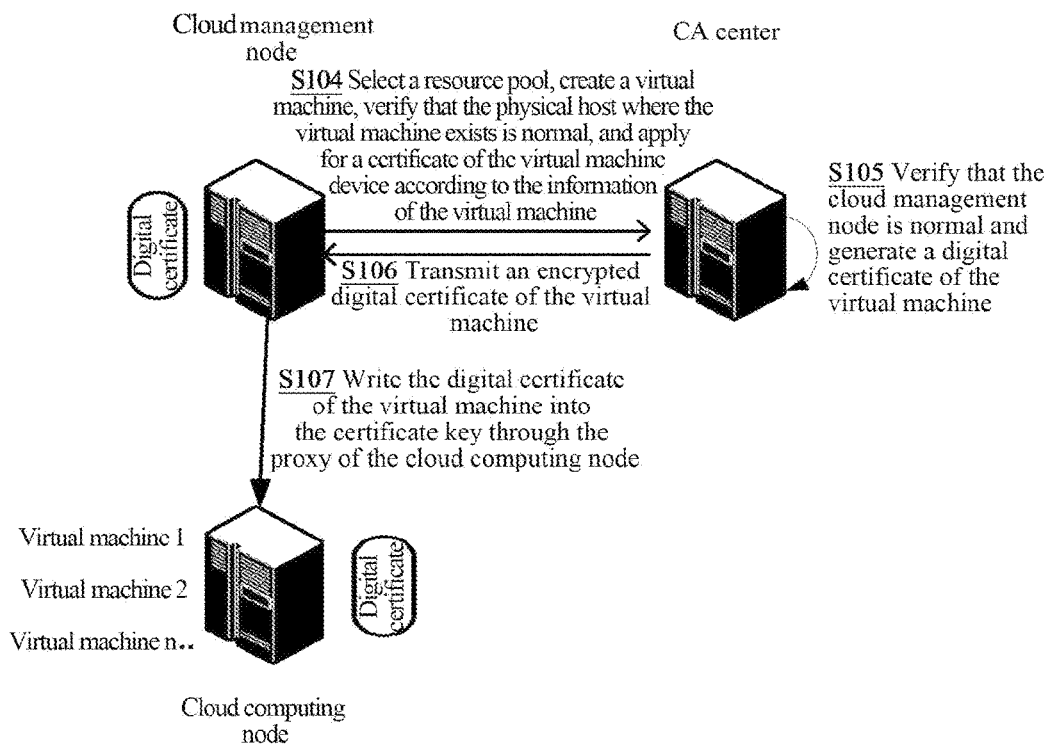
FIG. 3 is a flowchart illustrating the issuing of a digital certificate for a virtual cloud computing machine in an embodiment of the present disclosure.

Specifically, refer to FIG. 3, in the present embodiment, issuing a digital certificate for the virtual cloud computing machine includes:

S104: the cloud management host first selects a resource pool and creates a virtual cloud computing machine of the physical cloud computing host, acquires, after verifying that the physical cloud computing host to which the virtual cloud computing machine belongs is normal, the key attribute information of the virtual cloud computing machine and sends an application for a digital certificate for the virtual cloud computing machine to the CA center according to the key attribute information acquired;

S105: the CA center verifies the digital certificate of the cloud management host and, if the verification is passed, generates a digital certificate file for the virtual cloud computing machine according to the key attribute information of the virtual cloud computing machine;

S106: the CA center returns an encrypted digital certificate file for the virtual cloud computing machine to the cloud management host; and S107: the cloud management host returns the encrypted digital certificate file for the virtual cloud computing machine to the physical cloud computing host to which the virtual cloud computing machine belongs; the physical cloud computing host verifies the encrypted digital certificate file for the virtual cloud computing machine through a proxy program deployed thereon, creates an isolated certificate container in the certificate key according to the key attribute information of the virtual cloud computing machine and writes the digital certificate for the virtual cloud computing machine in the certificate container.

Figure 4:
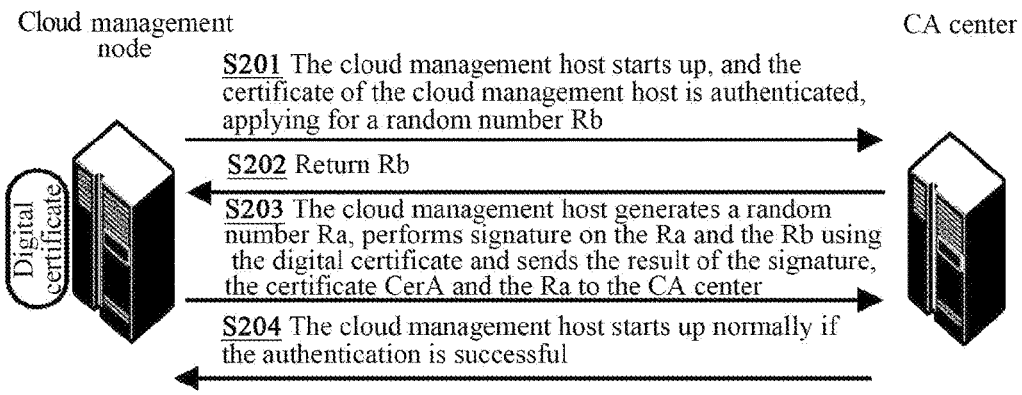
FIG. 4 is a flowchart illustrating an online authentication carried out by a cloud management host according to a digital certificate in an embodiment of the present disclosure.

Specifically, as shown in FIG. 4, in the present embodiment, carrying out a compliance authentication according to a corresponding digital certificate when the cloud management host starts up includes:

S201: when the cloud management host starts up, a certificate proxy deployed on the cloud management host sends an online or offline authentication request to the CA center and generates a random number Ra for the current authentication to request a random number Rb;

S202: the CA center responds to the request and returns the random number Rb for authentication;

S203: the certificate proxy on the cloud management host reads the digital certificate of the cloud management host from the certificate key according to the key attribute information of the cloud management host, performs digital signature on the random number Ra for the current authentication and the random number Rb for authentication using the digital certificate and sends the result of the signature, the digital certificate CerA of the cloud management host and the random number Ra for the current authentication to the CA center;

S204: the CA center authenticates the information received and, if the authentication is past, informs the cloud management host to continue to start up the flow, herein the authentication is carried out in a way that is well known to those of ordinary skill in the art and is therefore not described here repeatedly.

Figure 5:
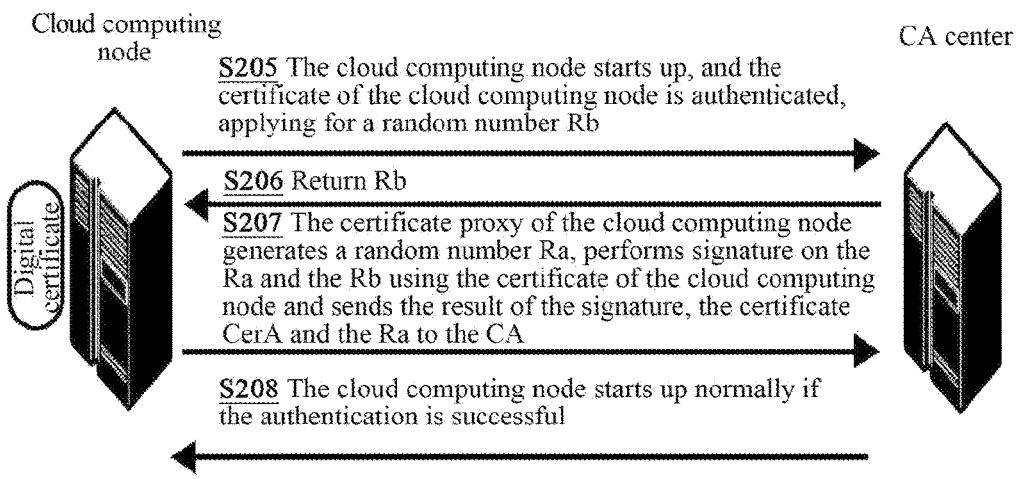
FIG. 5 is a flowchart illustrating an online authentication carried out by a physical cloud computing host according to a digital certificate in an embodiment of the present disclosure.

Specifically, as shown in FIG. 5, in the present embodiment, carrying out a compliance authentication according to a corresponding digital certificate when the physical cloud computing host starts up includes:

S205: when the physical cloud computing host starts up, a certificate proxy deployed on the physical cloud computing host reads the digital certificate of the physical cloud computing host from the certificate key according to the key attribute information of the physical cloud computing host, and sends an online or offline authentication request to the CA center and generates a random number Ra for the current authentication to apply for a random number Rb;

S206: the CA center responds to the request and returns the random number Rb for authentication;

S207: the certificate proxy on the physical cloud computing host reads the digital certificate of the physical cloud computing host from the certificate key according to the key attribute information of the physical cloud computing host, performs digital signature on the random number Ra for the current authentication and the random number Rb for authentication using the digital certificate and sends the result of the signature, the digital certificate CerA of the physical cloud computing host and the random number Ra for the current authentication to the CA center; and S208: the CA center authenticates the information received and, if the authentication is past, informs the physical cloud computing host to continue to start up the flow.

Specifically, in the present embodiment, carrying out a compliance authentication according to a corresponding digital certificate when the virtual cloud computing machine starts up includes:

S209: when the virtual cloud computing machine starts up, a certificate proxy on the physical cloud computing host to which the virtual cloud computing machine belongs reads the digital certificate of the virtual cloud computing machine from a corresponding certificate container in the certificate key according to the key attribute information (e.g. the MAC address, the CPU number and so on) of the virtual cloud computing machine, sends an online or offline authentication request to the CA center and generates a random number Ra for the current authentication;

S210: the CA center responds to the request and returns the random number Rb for authentication;

S211: the certificate proxy on the physical cloud computing host performs digital signature on the random number Ra for the current authentication and the random number Rb for authentication according to the digital certificate of the virtual cloud computing machine and sends the result of the signature, the digital certificate of the virtual cloud computing machine and the random number Ra for the current authentication to the CA center; and S212: the CA center authenticates the information received and, if the authentication is past, informs the virtual cloud computing machine to continue to start up the flow.

Figure 6:
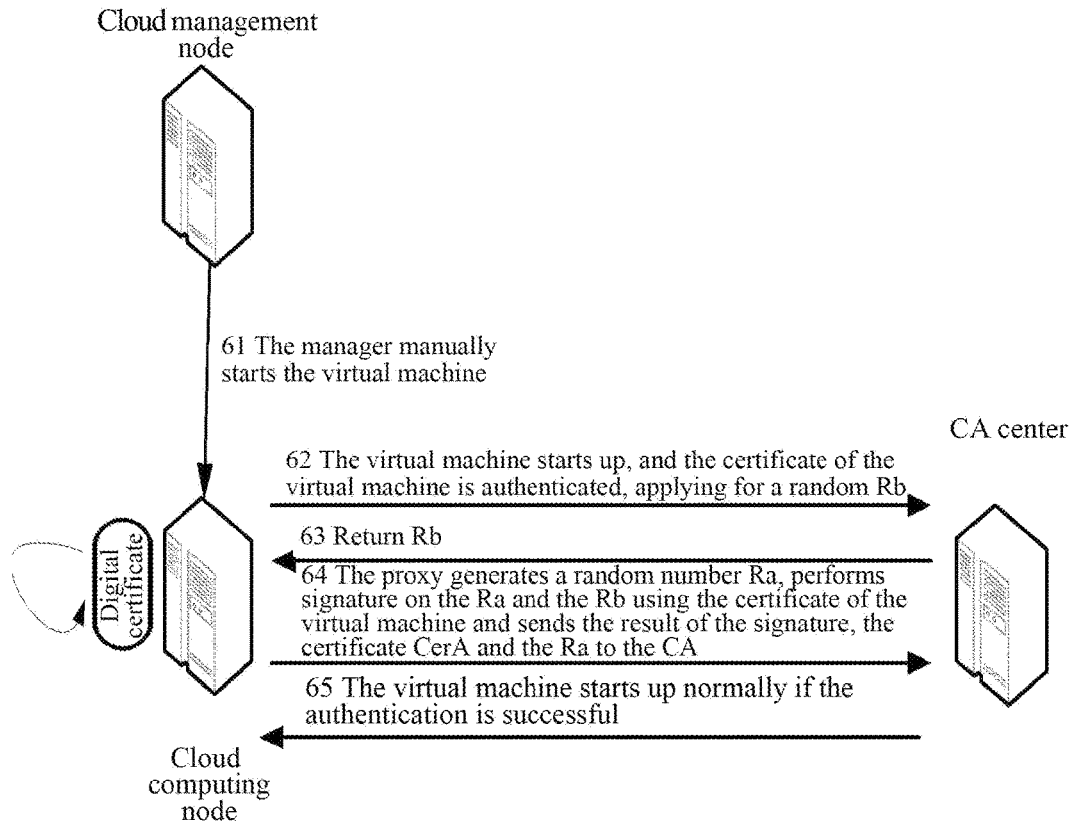
FIG. 6 is a flowchart illustrating an online authentication carried out by a virtual cloud computing machine according to a digital certificate when the virtual cloud computing machine is manually started in an embodiment of the present disclosure.

Apparently, a correspondingly virtual cloud computing machine can be manually started by a manager after the manager logs on the cloud management host node, or a startup strategy is configured in advance for the system to start a correspondingly virtual cloud computing machine automatically. As shown in FIG. 6, a flowchart illustrating the manual startup of a virtual cloud computing machine is shown, which specifically includes:

S61: a manager manually starts a virtual cloud computing machine in a way known in the prior art of the field.

S62: after the virtual cloud computing machine is started, the physical cloud computing host to which the virtual cloud computing machine belongs reads the digital certificate of the virtual cloud computing machine from a corresponding certificate container in the certificate key according to the key attribute information (e.g. the MAC address, the CPU number and so on) of the virtual cloud computing machine, sends an online or offline authentication request to the CA center, and generates a random number Ra for the current authentication to apply for a random number Rb;

S63: the CA center responds to the request and returns the random number Rb for authentication;

S64: the certificate proxy on the physical cloud computing host performs digital signature on the random number Ra for the current authentication and the random number Rb for authentication according to the digital certificate of the virtual cloud computing machine and sends the result of the signature, the digital certificate CerA of the virtual cloud computing machine and the random number Ra for the current authentication to the CA center; and S65: the CA center authenticates the information received and, if the authentication is past, informs the virtual cloud computing machine to continue to start up the flow.

Figure 7:
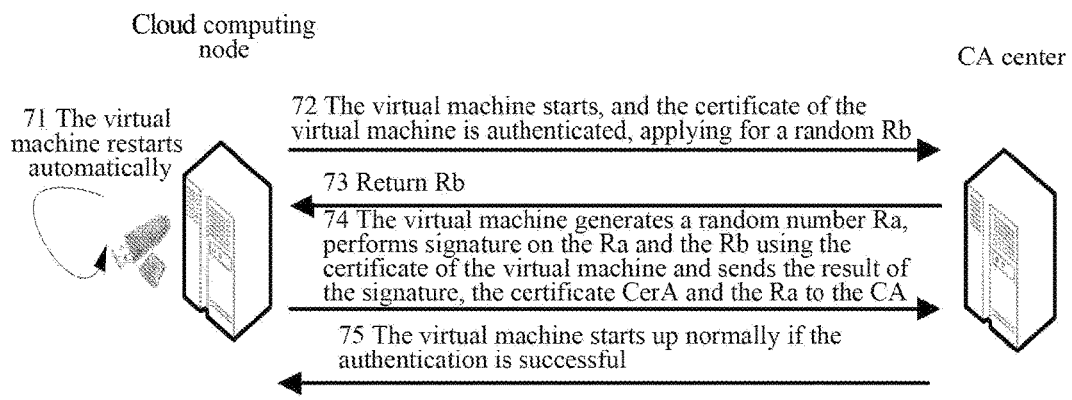
FIG. 7 is a flowchart illustrating an online authentication carried out by a virtual cloud computing machine according to a digital certificate when the virtual cloud computing machine is started automatically in an embodiment of the present disclosure.

As shown in FIG. 7, a flowchart illustrating the automatic startup of a virtual cloud computing machine is shown, which includes:

S71: a virtual cloud computing machine restarts automatically according to a preset automatic startup strategy, herein the automatic startup strategy is the prior art of the field;

S72: after the virtual cloud computing machine is started, the physical cloud computing host to which the virtual cloud computing machine belongs reads the digital certificate of the virtual cloud computing machine from a corresponding certificate container in the certificate key according to the key attribute information (e.g. the MAC address, the CPU number and so on) of the virtual cloud computing machine, sends an online or offline authentication request to the CA center and generates a random number Ra for the current authentication to apply for a random number Rb;

S73: the CA center responds to the request and returns the random number Rb for authentication;

S74: the certificate proxy on the physical cloud computing host performs digital signature on the random number Ra for the current authentication and the random number Rb for authentication according to the digital certificate of the virtual cloud computing machine and sends the result of the signature, the digital certificate CerA of the virtual cloud computing machine and the random number Ra for the current authentication to the CA center; and S75: the CA center authenticates the information received and, if the authentication is past, informs the virtual cloud computing machine to continue to start up the flow.

Specifically, in the present embodiment, carrying out a compliance authentication according to a corresponding digital certificate when the cloud management host is in running process specifically includes:

the certificate proxy of the cloud management host checks the compliance of the certificate cyclically, acquires the key attribute information of the cloud management host when the time set by a monitoring timer is up, reads the digital certificate of the cloud management host from the certificate key according to the key attribute information acquired and sends an online or offline authentication request to the CA center; if the authentication implemented by the CA center is past, the cloud management host continues to run, otherwise, the CA center generates a warning and sends a notification message to inform the manager to implement a processing. Herein, based on the first timer, the compliance authentication is carried out periodically according to a corresponding digital certificate when the cloud management host is in running process.

Specifically, in the present embodiment, the step of carrying out a compliance authentication according to a corresponding digital certificate when the physical cloud computing host is in running process includes:

the certificate proxy of the physical cloud host checks the compliance of the certificate cyclically, acquires the key attribute information of the physical cloud computing host when the time set by a monitoring timer is up, reads the digital certificate of the physical cloud computing host from the certificate key according to the key attribute information acquired, and sends an online or offline authentication request to the CA center; if the authentication implemented by the CA center is past, the physical cloud computing host continues to run, otherwise, the CA center generates a warning and sends a notification message to inform the manager to implement a processing. Herein, based on the second timer, the compliance authentication is carried out periodically according to a corresponding digital certificate when the physical cloud computing host is in running process.

Specifically, in the present embodiment, the step of carrying out a compliance authentication according to a corresponding digital certificate when the virtual cloud computing machine is in running process includes:

the certificate proxy of the physical cloud computing host to which the virtual cloud computing machine belongs checks the compliance of the certificate cyclically, acquires the key attribute information of the virtual cloud computing machine when the time set by a monitoring timer is up, reads the digital certificate of the virtual cloud computing machine from a corresponding certificate container in the certificate key according to the key attribute information acquired, and sends an online or offline authentication request to the CA center; if the authentication implemented by the CA center is past, the virtual cloud computing machine continues to run, otherwise, the CA center generates a warning and sends a notification message to inform the manager to implement a processing. Herein, based on the third timer, the compliance authentication is carried out periodically according to a corresponding digital certificate when the virtual cloud computing machine is in the running process.

Certainly, the essence of the present disclosure is set forth above based on the application of the method disclosed herein in a cloud environment, however, it should be appreciated that the method provided in the embodiments of the present disclosure can be not only applicable to a cloud environment, but also a non-cloud environment can be applicable to the present disclosure. For example, in the application of the embodiments of the present disclosure to a system based on a docker container but not virtual machines, a docker is associated with a virtual digital certificate while other network elements are configured with corresponding digital certificates, and a corresponding compliance authentication is carried out using these configured digital certificates during the subsequent startup or running process, thereby guaranteeing the information security of the system.

Accordingly, a digital certificate based information security realization system is further provided in the embodiments of the present disclosure, which includes: a CA center, a cloud management host, a physical cloud computing host and at least one virtual cloud computing machine created according to the physical cloud computing host, herein the CA center is arranged to separately issue a digital certificate for the cloud management host, the physical cloud computing host and the virtual cloud computing machine under the management control of the cloud management host;

the cloud management host is arranged to carry out a compliance authentication according to a corresponding digital certificate during the startup or running process thereof;

the physical cloud computing host is arranged to carry out a compliance authentication according to a corresponding digital certificate during the startup or running process thereof; and the virtual cloud computing machine is arranged to carry out a compliance authentication according to a corresponding digital certificate during the startup or running process thereof.

Specifically, in the present embodiment, the CA center is specifically arranged to: generate a digital certificate for the cloud management host according to the key attribute information of the cloud management host and make a card;

verify the digital certificate of the cloud management host and, if the verification is passed, generate a digital certificate for the physical cloud computing host according to the key attribute information of the physical cloud computing host and make a card; and verify the digital certificate of the cloud management host and, if the verification is passed, generate a digital certificate file for the virtual cloud computing machine according to the key attribute information of the virtual cloud computing machine and return an encrypted digital certificate file for the virtual cloud computing machine to the cloud management host.

Accordingly, the cloud management host is further arranged to acquire the key attribute information (the key information such as the MAC address, the CPU number and so on) of the physical cloud computing host through a certificate proxy deployed on a correspondingly physical cloud computing host and send an application for a digital certificate for the physical cloud computing host to the CA center according to the key attribute information acquired; and acquire the key attribute information of the virtual cloud computing machine after verifying that the physical cloud computing host to which the virtual cloud computing machine belongs is normal, send an application for a digital certificate for the virtual cloud computing machine to the CA center according to the key attribute information acquired, and return an encrypted digital certificate file for the virtual cloud computing machine to the physical cloud computing host to which the virtual cloud computing machine belongs; and the physical cloud computing host is further arranged to authenticate the encrypted digital certificate file for the virtual cloud computing machine through a proxy program deployed thereon, create an isolated certificate container in the certificate key according to the key attribute information of the virtual cloud computing machine and write the digital certificate of the virtual cloud computing machine into the certificate container. Herein, in the present embodiment, each certificate container in the certificate key is arranged to store a separate digital certificate, and the reader of each digital certificate can only read the digital certificate according to the reader has the right to read.

Specifically, in the present embodiment, carrying out a compliance authentication according to a corresponding digital certificate when the cloud management host, the physical cloud computing host and the virtual cloud computing machine start up specifically includes:

the cloud management host is specifically arranged in the following way:

when the cloud management host starts up, a certificate proxy deployed on the cloud management host sends an online or offline authentication request to the CA center and generate a random number Ra for the current authentication, receives a random number Rb for authentication which is returned to the cloud management host as a response to the request from the CA center, the certificate proxy of the cloud management host reads the digital certificate of the cloud management host from the certificate key according to the key attribute information of the cloud management host, performs digital signature on the random number Ra for the current authentication and the random number Rb for authentication using the digital certificate and sends the result of the signature, the digital certificate of the cloud management host and the random number Ra for the current authentication to the CA center; and the cloud management host receives, from the CA center, a notice on the success of the authentication on the received information and then continues to start up the flow.

The physical cloud computing host is specifically arranged in the following way:

when the physical cloud computing host starts up, a certificate proxy deployed on the physical cloud computing host reads the digital certificate of the physical cloud computing host from the certificate key according to the key attribute information of the physical cloud computing host, sends an online or offline authentication request to the CA center and generate a random number Ra for the current authentication, receives a random number Rb for authentication which is returned to the physical cloud computing host as a response to the request from the CA center, the certificate proxy of the physical cloud computing host reads the digital certificate of the physical cloud computing host from the certificate key according to the key attribute information of the physical cloud computing host, performs digital signature on the random number Ra for the current authentication and the random number Rb for authentication using the digital certificate, and sends the result of the signature, the digital certificate of the physical cloud computing host and the random number Ra for the current authentication to the CA center; and the physical cloud computing host receives, from the CA center, a notice on the success of the authentication on the received information and then continues to start up the flow.

The virtual cloud computing machine is specifically arranged in the following way:

when the virtual cloud computing machine starts up, a certificate proxy deployed on the physical cloud computing host to which the virtual cloud computing machine belongs reads the digital certificate of the virtual cloud computing machine from a corresponding certificate container in the certificate key according to the key attribute information of the virtual cloud computing machine, sends an online or offline authentication request to the CA center and generates a random number Ra for the current authentication; receives a random number Rb for authentication which is returned to the virtual cloud computing machine as a response to the request from the CA center, the certificate proxy of the virtual cloud computing machine performs digital signature on the random number Ra for the current authentication and the random number Rb for authentication according to the digital certificate of the virtual cloud computing machine and sends the result of the signature, the digital certificate of the virtual cloud computing machine and the random number Ra for the current authentication to the CA center; and the virtual cloud computing machine receives, from the CA center, a notice on the success of the authentication on the received information and then continues to start up the flow.

Certainly, a correspondingly virtual cloud computing machine can be manually started by a manager after the manager logs on a cloud management host node, or a startup strategy can be configured in advance so that a correspondingly virtual cloud computing machine is started automatically by a system. Continue to refer to FIG. 6, which shows a flowchart illustrating the manual startup of a virtual cloud computing machine, and continue to refer to FIG. 7 which shows a flowchart illustrating the automatic startup of a virtual cloud computing machine.

Specifically, in the present embodiment, carrying out a compliance authentication according to a corresponding digital certificate when the cloud management host, the physical cloud computing host and the virtual cloud computing machine are running specifically includes:

the cloud management host is specifically arranged in the following way: when the time preset by the first timer is up, the certificate proxy of the cloud management host acquires the key attribute information of the cloud management host, reads the digital certificate of the cloud management host from the certificate key according to the key attribute information acquired, and sends an online or offline authentication request to the CA center, and the cloud management host continues to run after receiving, from the CA center, a notice on the success of the authentication.

Otherwise, the CA center is further arranged to: generate a warning and sends a notification message to inform the manager to implement a processing.

The physical cloud computing host is specifically arranged in the following way: when the time preset by the second timer is up, the certificate proxy of the physical cloud computing host acquires the key attribute information of the physical cloud computing host, reads the digital certificate of the physical cloud computing host from the certificate key according to the key attribute information acquired, and sends an online or offline authentication request to the CA center, and the physical cloud computing host continues to run after receiving, from the CA center, a notice on the success of the authentication.

Otherwise, the CA center is further arranged to generate a warning and sends a notification message to inform the manager to implement a processing.

The virtual cloud computing machine is specifically arranged in the following way: when the time preset by the third timer is up, the certificate proxy of the physical cloud computing host to which the virtual cloud computing machine belongs acquires the key attribute information of the virtual cloud computing machine, reads the digital certificate of the virtual cloud computing machine from a corresponding certificate container in the certificate key according to the key attribute information acquired, and sends an online or offline authentication request to the CA center, and the virtual cloud computing machine continues to run after receiving, from the CA center, a notice on the success of the authentication.

Otherwise, the CA center is further arranged to generate a warning and sends a notification message to inform the manager to implement a processing.

The above description is only the embodiments of the present disclosure, it should be appreciated that these embodiments are not intended to limit the scope of the present disclosure, and that any equivalent structures or transformed flow devised based on the description and the accompanying drawings of the present disclosure and any direct or indirect application of the present disclosure to other related technical fields should fall within the scope of protection of the present disclosure.

INDUSTRIAL APPLICABILITY

A digital certificate based information security realization method and system are provided in embodiments of the present disclosure. The method includes: separately issuing a digital certificate for a cloud management host, a physical cloud computing host and a virtual cloud computing machine; and carrying out a compliance authentication according to a corresponding digital certificate when the cloud management host, the physical cloud computing host and the virtual cloud computing machine start up or are in running process. By using a digital certificate trust chain technology for reference and combining with a cloud management system, the digital certificate based information security realization method and system provided in embodiments of the present disclosure realize trusted systems of the cloud management system, the physical host and the virtual machine; moreover, by putting emphasis on the security protection of the host platform of a system itself, the security of a virtual cloud platform is improved.

What I claim is:

1. A digital certificate based information security realization method, comprising:
    separately issuing a digital certificate for each one of a cloud management host, a physical cloud computing host and a virtual cloud computing machine; wherein the physical cloud computing host is a bear of the virtual machine, and
    carrying out a compliance authentication respectively on the cloud management host, the physical cloud computing host and the virtual cloud computing machine according to a corresponding digital certificate when the cloud management host, the physical cloud computing host and the virtual cloud computing machine start up or are in a running process; wherein the cloud management host, the physical cloud computing host and at least one the virtual cloud computing machine guarantee for each other when requesting certificates and authenticate each other during an authentication process;

wherein, the issuing a digital certificate for a cloud management host comprises:
    generating, by a Certificate Authority, CA, center, a digital certificate of the cloud management host according to key attribute information of the cloud management host, and making a card by the CA center;

wherein, carrying out a compliance authentication according to a corresponding digital certificate when the cloud management host starts up comprises:
    sending, by a certificate proxy deployed on the cloud management host, an online or offline authentication request to the CA center; and generating, by the certificate proxy, a random number Ra for a current authentication, and returning, by the CA center, a random number Rb for authentication as a response to the request; and
    reading, by the certificate proxy of the cloud management host, the digital certificate of the cloud management host from a certificate key according to the key attribute information of the cloud management host; performing, by the certificate proxy, digital signature on the random number Ra for the current authentication and the random number Rb for authentication using the digital certificate; sending, by the certificate proxy, the result of the signature, the digital certificate of the cloud management host and the random number Ra for the current authentication to the CA center; authenticating, by the CA center, the received information; and if the authentication is successful, informing, by the CA center, the cloud management host to continue to start up the flow.

2. The information security realization method according to claim 1, wherein, the issuing a digital certificate for the physical cloud computing host comprises:
    acquiring, by the cloud management host, key attribute information of the physical cloud computing host through a certificate proxy deployed on a corresponding physical cloud computing host; and sending, by the cloud management host, an application for a digital certificate of the physical cloud computing host to a CA center according to the acquired key attribute information; and
    verifying, by the CA center, the digital certificate of the cloud management host; and if the verification is passed, generating, by the CA center, the digital certificate of the physical cloud computing host according to the key attribute information of the physical cloud computing host and making a card by the CA center.

3. The information security realization method according to claim 1, wherein, the issuing a digital certificate for the virtual cloud computing machine comprises:
    after the cloud management host verifies that the physical cloud computing host to which the virtual cloud computing machine belongs is normal, acquiring, by the cloud management host, key attribute information of the virtual cloud computing machine; and sending, by the cloud management host, an application for a digital certificate of the virtual cloud computing machine to a CA center according to the acquired key attribute information;

verifying, by the CA center, the digital certificate of the cloud management host; and if the verification is passed, generating, by the CA center, a digital certificate file for the virtual cloud computing machine according to the key attribute information of the virtual cloud computing machine;

returning, by the CA center, an encrypted digital certificate file for the virtual cloud computing machine to the cloud management host; and returning, by the cloud management host, the encrypted digital certificate file for the virtual cloud computing machine to the physical cloud computing host to which the virtual cloud computing machine belongs; verifying, by the physical cloud computing host, the encrypted digital certificate file for the virtual cloud computing machine through a proxy program deployed thereon; creating, by the physical cloud computing host, an isolated certificate container in a certificate key according to the key attribute information of the virtual cloud computing machine; and writing, by the physical cloud computing host, the digital certificate of the virtual cloud computing machine into the certificate container.

4. The information security realization method according to claim 3, wherein, each certificate container in the certificate key is arranged to store a separate digital certificate.

5. The information security realization method according to claim 2, wherein, carrying out a compliance authentication according to a corresponding digital certificate when the physical cloud computing host starts up comprises:

reading, by a certificate proxy deployed on the physical cloud computing host, the digital certificate of the physical cloud computing host from a certificate key according to the key attribute information of the physical cloud computing host; sending, by the certificate proxy, an online or offline authentication request to the CA center; and generating, by the certificate proxy, a random number Ra for a current authentication; and returning, by the CA center, a random number Rb for authentication as a response to the request; and reading, by the certificate proxy of the physical cloud computing host, the digital certificate of the physical cloud computing host from the certificate key according to the key attribute information of the physical cloud computing host; performing, by the certificate proxy of the physical cloud computing host, digital signature on the random number Ra for a current authentication and the random number Rb for authentication using the digital certificate; sending, by the certificate proxy of the physical cloud computing host, the result of the signature, the digital certificate of the physical cloud computing host and the random number Ra for the current authentication to the CA center; authenticating, by the CA center, the received information; and if the authentication is successful, informing, by the CA center, the physical cloud computing host to continue to start up the flow.

6. The information security realization method according to claim 3, wherein, carrying out a compliance authentication according to a corresponding digital certificate when the virtual cloud computing machine starts up comprises:

reading, by a certificate proxy on the physical cloud computing host to which the virtual cloud computing machine belongs, the digital certificate of the virtual cloud computing machine from a corresponding certificate container in a certificate key according to the key attribute information of the virtual cloud computing machine; sending, by the certificate proxy, an online or offline authentication request to the CA center; generating, by the certificate proxy, a random number Ra for a current authentication; and returning, by the CA center, a random number Rb for authentication as a response to the request; and performing, by the certificate proxy on the physical cloud computing host, digital signature on the random number Ra for the current authentication and the random number Rb for authentication according to the digital certificate of the virtual cloud computing machine; sending, by the certificate proxy, the result of the signature, the digital certificate of the virtual cloud computing machine and the random number Ra for the current authentication to the CA center; authenticating, by the CA center, the received information; and if the authentication is successful, informing, by the CA center, the virtual cloud computing machine to continue to start up the flow.

7. The information security realization method according to claim 1, wherein, carrying out a compliance authentication according to a corresponding digital certificate when the cloud management host is in a running process comprises:

acquiring, by a certificate proxy of the cloud management host, key attribute information of the cloud management host when time preset by a first timer is up; reading, by the certificate proxy, the digital certificate of the cloud management host from a certificate key according to the acquired key attribute information; and sending, by the certificate proxy, an online or offline authentication request to a CA center, the cloud management host continues to run if the authentication implemented by the CA center is passed.

8. The information security realization method according to claim 1, wherein, carrying out a compliance authentication according to a corresponding digital certificate when the physical cloud computing host is in a running process comprises:

acquiring, by a certificate proxy of the physical cloud computing host, key attribute information of the physical cloud computing host when time preset by a second timer is up; reading, by the certificate proxy, the digital certificate of the physical cloud computing host from a certificate key according to the acquired key attribute information; and sending, by the certificate proxy, an online or offline authentication request to a CA center, the physical cloud computing host continues to run if the authentication implemented by the CA center is passed.

9. The information security realization method according to claim 1, wherein, carrying out a compliance authentication according to a corresponding digital certificate when the virtual cloud computing machine is in a running process comprises:

acquiring, by a certificate proxy of the physical cloud computing host to which the virtual cloud computing machine belongs, key attribute information of the virtual cloud computing machine when time preset by a third timer is up; reading, by the certificate proxy, the digital certificate of the virtual cloud computing machine from a corresponding certificate container in a certificate key according to the acquired key attribute information; and sending, by the certificate proxy, an online or offline authentication request to a CA center, the virtual cloud computing machine continues to run if the authentication implemented by the CA center is passed.

10. A digital certificate based information security realization system, comprising: a CA center, a cloud management host, a physical cloud computing host and at least one virtual cloud computing machine created according to the physical cloud computing host, wherein at least the cloud management host and the physical cloud computing host are hardware elements, the CA center is arranged to separately issue a digital certificate for the cloud management host, the physical cloud computing host and the virtual cloud computing machine under the management control of the cloud management host;

the cloud management host is arranged to carry out a compliance authentication according to a corresponding digital certificate during the startup or running process;

the physical cloud computing host is arranged to carry out a compliance authentication according to a corresponding digital certificate during the startup or running process; and the virtual cloud computing machine is arranged to carry out a compliance authentication according to a corresponding digital certificate during the startup or running process;

wherein the cloud management host, the physical cloud computing host and at least one the virtual cloud computing machine guarantee for each other when requesting certificates and authenticate each other during an authentication process;

wherein the CA center is arranged to generate a digital certificate of the cloud management host according to key attribute information of the cloud management host, and make a card;

wherein a certificate proxy deployed on the cloud management host is arranged to send an online or offline authentication request to the CA center, and generate a random number Ra for a current authentication; the CA center is arranged to return a random number Rb for authentication as a response to the request; and the certificate proxy of the cloud management host is arranged to read the digital certificate of the cloud management host from a certificate key according to the key attribute information of the cloud management host, perform digital signature on the random number Ra for the current authentication and the random number Rb for authentication using the digital certificate, send the result of the signature, the digital certificate of the cloud management host and the random number Ra for the current authentication to the CA center; the CA center is arranged to authenticate the received information, and if the authentication is successful, inform the cloud management host to continue to start up the flow.

* * * * *